H. A. BLAKEMAN.
Cheese Curd Cutter.
No. 41,271.                                    Patented Jan. 19, 1864.
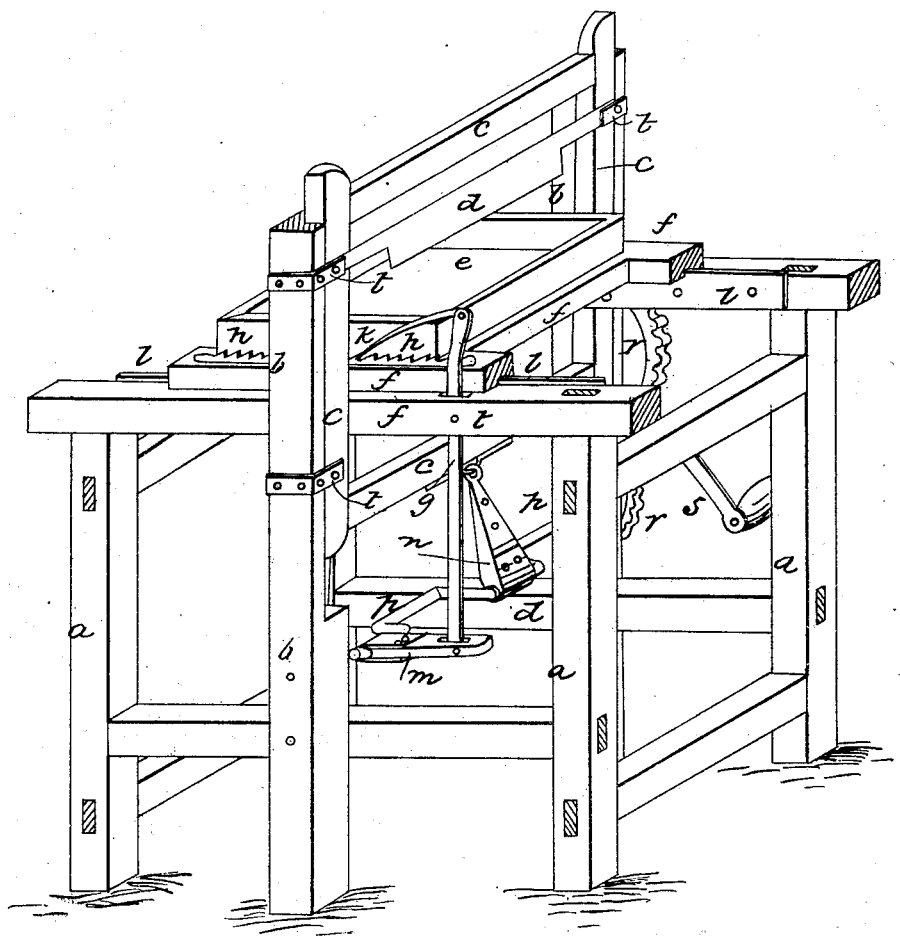
Witnesses
Chas. Foster
Jonathan Hubbard
Inventor
H. A. Blakeman

UNITED STATES PATENT OFFICE.

HORACE A. BLAKEMAN, OF CUYLER, NEW YORK.

IMPROVEMENT IN CHEESE-CURD CUTTERS.

Specification forming part of Letters Patent No. 41,271, dated January 19, 1864

*To all whom it may concern:*

Be it known that I, HORACE A. BLAKEMAN, of Cuyler, in the county of Cortland and State of New York, have invented a new and useful Improvement on Machines for Cutting Cheese-Curd; and I do hereby declare that the following is a full, clear, and exact description of the construction and operation of the same, reference being had to the annexed drawing, making a part of this specification, representing a perspective view.

$a\ a$ is a substantial frame for supporting the apparatus, with side posts, $b\ b$, extending above it.

$r\ r$ is the gearing driven by the crank $s$, and turning the shaft $p\ p$. Upon this shaft is a crank, with the crank-rod $n$ driving the frame $c\ c$ up and down in the slot in the side posts, $b\ b$. Across the frame $c\ c$ is placed a broad strong knife, $d$.

$f\ f$ is a square frame, sliding upon rails $l\ l$, attached to the main frame.

Fitting into the frame $f\ f$ is a square box, $e$, to contain the curd, which can be taken out and put in, as desired, either side front.

Upon the shaft $p\ p$ is another crank, with rod $m$, operating the lever $g$, which is pivoted at $t$, and operates the dog $k$, fitting into the ratchet $h\ h$ on the frame $f\ f$.

The box being drawn back and filled with curd, at each revolution of the shaft $p$ the knife is brought down, cutting through the curd, and at each revolution of the shaft also the dog operating upon the ratchet pushes forward the frame $f\ f$ with the box $e$, and thus continues to operate until the whole curd has passed under the knife. The box, being square, is then drawn back and turned one quarter round, and then again run under the knife. The curd is thus cut in squares and ready for pressing into cheese.

It is necessary in the proper manufacture of cheese that the curd should be broken or cut as fine as possible before pressing. This is generally done by hand, and is a slow and laborious process. The advantage claimed for this machine is that it cuts up the curd as finely as desired with little labor and very quickly.

What I claim, and desire to secure by Letters Patent, is—

The frame $c$ and knife $d$, driven as represented, in combination with the box $e$ in the frame $f$, operated by the dog and ratchet or their equivalents, when used as and for the purposes set forth.

H. A. BLAKEMAN.

Witnesses:
 CHAS. FOSTER,
 W. A. PICKER.